US011556864B2

(12) United States Patent
Yuan et al.

(10) Patent No.: US 11,556,864 B2
(45) Date of Patent: Jan. 17, 2023

(54) USER-NOTIFICATION SCHEDULING

(71) Applicant: Microsoft Technology Licensing, LLC, Redmond, WA (US)

(72) Inventors: Yiping Yuan, Sunnyvale, CA (US); Ajith Muralidharan, Sunnyvale, CA (US); Shaunak Chatterjee, Sunnyvale, CA (US); Preetam Nandy, Santa Clara, CA (US); Shipeng Yu, Sunnyvale, CA (US); Miao Cheng, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 606 days.

(21) Appl. No.: 16/674,422

(22) Filed: Nov. 5, 2019

(65) Prior Publication Data

US 2021/0133642 A1    May 6, 2021

(51) Int. Cl.
*G06Q 10/04* (2012.01)
*G06N 20/00* (2019.01)
*G06Q 10/06* (2012.01)
*G06F 9/54* (2006.01)
*G06Q 10/10* (2012.01)
*G06N 3/08* (2006.01)

(52) U.S. Cl.
CPC .............. *G06Q 10/04* (2013.01); *G06F 9/542* (2013.01); *G06N 3/08* (2013.01); *G06N 20/00* (2019.01); *G06Q 10/063114* (2013.01); *G06Q 10/109* (2013.01)

(58) Field of Classification Search
CPC ........... G06Q 10/04; G06Q 10/063114; G06Q 10/109; G06N 20/00; G06N 3/08; G06F 9/542

USPC ......................................................... 706/12
See application file for complete search history.

(56) References Cited

U.S. PATENT DOCUMENTS

| 2004/0143636 | A1* | 7/2004 | Horvitz ................. H04L 51/212 709/207 |
| 2016/0283970 | A1* | 9/2016 | Ghavamzadeh ... G06Q 30/0269 |
| 2019/0188594 | A1 | 6/2019 | Yuan et al. |
| 2019/0235936 | A1* | 8/2019 | Murdock ................ G06F 9/542 |
| 2020/0008171 | A1* | 1/2020 | Jagannathan ......... H04L 51/214 |

(Continued)

FOREIGN PATENT DOCUMENTS

WO    WO-2020207249 A1 * 10/2020

*Primary Examiner* — James E Springer
(74) *Attorney, Agent, or Firm* — Schwegman Lundberg & Woessner, P.A.

(57) ABSTRACT

Methods, systems, and computer programs are presented for scheduling user notifications to maximize short-term and long-term benefits from sending the notifications. One method includes an operation for identifying features of a state used for reinforcement learning. The state is associated with an action to decide if a notification to a user is to be sent and a reward for sending the notification to the user. Further, the method includes capturing user responses to notifications sent to users to obtain training data and training a machine-learning (ML) algorithm with reinforcement learning based on the features and the training data to obtain an ML model. Additionally, the method includes receiving a request to send a notification to the user, and deciding, by the ML model, whether to send the notification based on a current state. The notification is sent to the user based on the decision.

16 Claims, 11 Drawing Sheets

(56) References Cited

U.S. PATENT DOCUMENTS

2020/0042865 A1\* 2/2020 Lee ...................... G06N 3/0454
2020/0059702 A1\* 2/2020 Yeo .................... H04N 21/4131
2020/0336450 A1\* 10/2020 Gao ...................... H04L 51/212
2020/0413138 A1\* 12/2020 Graf ......................... G06N 3/08

\* cited by examiner

NOTIFICATION DECISIONS ARE A SEQUENTIAL DECISION PROCESS

ENVIRONMENT: USER INFORMATION AND OTHER FACTORS
STATE $s$: QUEUE SIZE, BADGE COUNT, USER ENGAGEMENT LEVEL, ...
ACTION $a$: DECISION TO SEND OR NOT SEND
REWARD $r$: WHETHER THERE IS SESSION BETWEEN $t$ AND $t+1$
POLICY $\pi$: TAKE ACTION BASED ON STATE $s$

STATE REPRESENTATION

| Feature Name | Description |
|---|---|
| userLifeCycle | Categorical variable of user life cycle, e.g., "FOURBYFOUR" |
| currentNotificationBadgeCount | Current outer badge count of the app, e.g., 2.0 |
| localTime | Local hour of a user at the decision time, e.g., 2AM |
| LastClientApplication | Last used client application, e.g. VOYAGER_ANDROID |
| notificationQueueSize | Number of valid notifications in the queue for a member, e.g., 3.0 |
| maxFPRScoreInQueue | Max FPR (pClick) score of valid notifications in the queue, e.g., 0.697 |
| hoursSinceLastBadgeUpdate | Time difference in hours between current timestamp and last badge count, e.g. 12 |
| isCapped | Whether hoursSinceLastBadgeUpdate is capped at a week (24*7), e.g., 1.0 |

FIG. 5

USER-NOTIFICATION SCHEDULING

TECHNICAL FIELD

The subject matter disclosed herein generally relates to methods, systems, and machine-readable storage media for managing user communications.

BACKGROUND

Mobile notifications have taken a major role in driving and maintaining user engagement with companies and online services. With the right content and the right timing, notifications can inform users of timely messages, making the notification service valuable to the user.

Typically, senders of notifications measure success by looking at the near-term impact through signals such as click-through-rates and time-to-visits. However, notification decisions may have a long-term impact that may be negative for the service provider. For example, sending too many or too frequent notifications may benefit the short-term engagement, but it may hurt long-term user engagement if users start reacting negatively to too many notifications, which may cause canceling future notifications. Even with a fixed delivery schedule over a time period, deferring non-time-sensitive notifications to a future time may improve the overall user satisfaction and engagement.

BRIEF DESCRIPTION OF THE DRAWINGS

Various ones of the appended drawings merely illustrate example embodiments of the present disclosure and cannot be considered as limiting its scope.

FIG. 5 is a table showing features for representing a state, according to some example embodiments.

DETAILED DESCRIPTION

Example methods, systems, and computer programs are directed to scheduling user notifications to maximize short-term and long-term benefits from sending the notifications. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, an intelligent decision-making system for scheduling notifications optimizes the long-term user engagement for users of an online service. The scheduler determines a medium-term notification to determine when to send a notification to optimize performance parameters (e.g., total number of sessions within a week). Further, the scheduler determines a long-term notification optimization to determine when to send a notification to optimize the total value to the user. Further yet, the scheduler determines the long-term notification optimization to determine when to drop notifications (e.g., too many notifications sent within a time frame).

In some example embodiments, the scheduler is implemented using machine learning and reinforcement learning. Machine learning is used to determine delivery policies based on the analysis of user responses to notifications. Reinforcement learning improves on the basic concept of machine learning by keeping track of the current state of the user regarding the notification delivery schedule.

One general aspect includes a method that includes an operation for identifying features of a state used for reinforcement learning. The state is associated with an action to decide if a notification to a user is to be sent and a reward for sending the notification to the user. Further, the method includes capturing user responses to notifications sent to users to obtain training data, and training a machine-learning (ML) algorithm with reinforcement learning based on the features and the training data to obtain an ML model. Additionally, the method includes receiving a request to send a notification to the user, and deciding, by the ML model, whether to send the notification based on a current state. The notification is sent to the user based on the decision.

Figure 1:
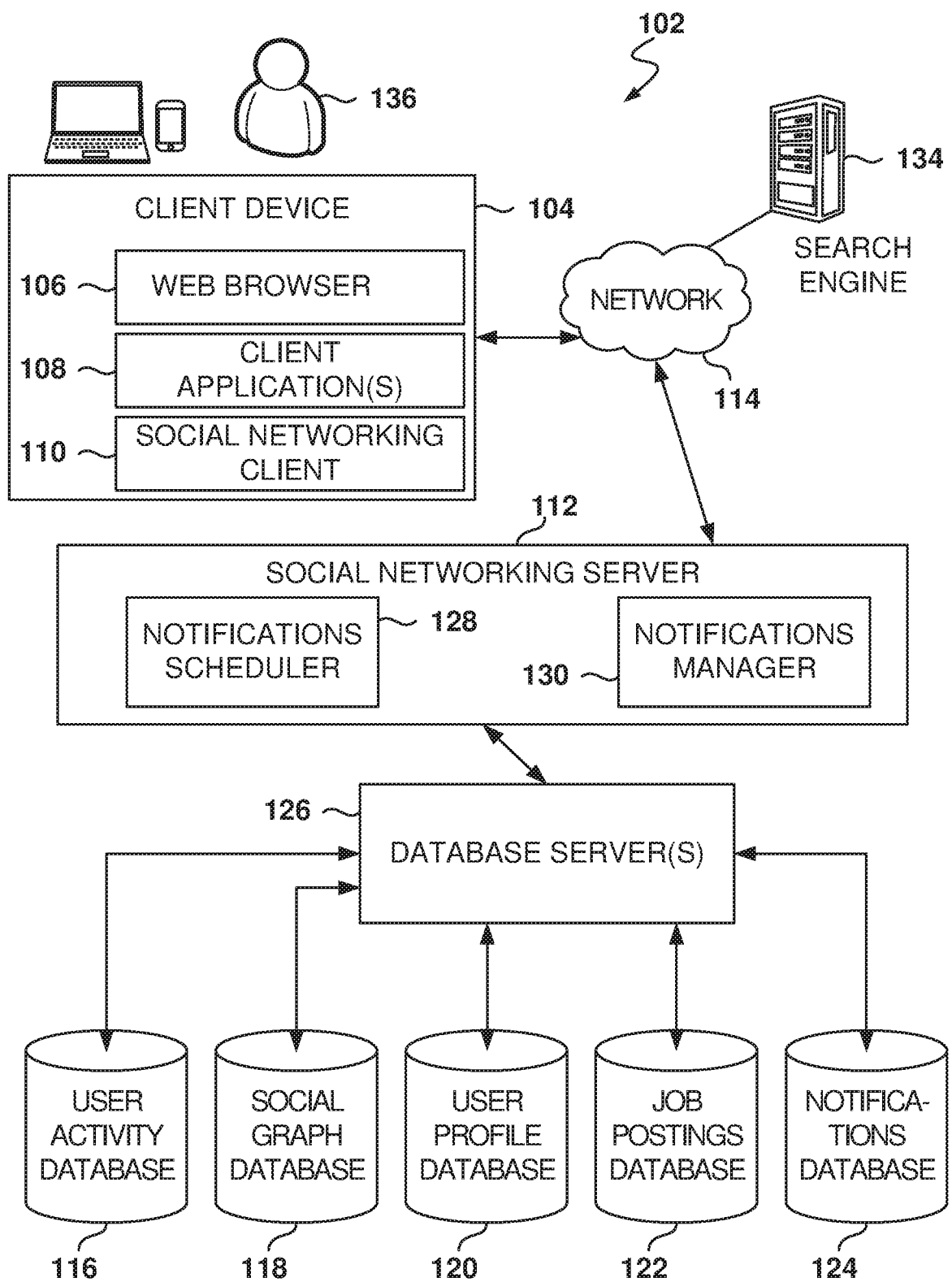
FIG. 1 is a block diagram illustrating a networked system, according to some example embodiments.

FIG. 1 is a block diagram illustrating a networked system, according to some example embodiments, including a social networking server 112, illustrating an example embodiment of a high-level client-server-based network architecture 102. Embodiments are presented with reference to an online service and, in some example embodiments, the online service is a social networking service.

The social networking server 112 provides server-side functionality via a network 114 (e.g., the Internet or a wide area network (WAN)) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-224.

The client device 104 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 136 may utilize to access the social networking server 112. In some embodiments, the client device 104 may comprise a display module (not shown) to display information (e.g., in the form of user interfaces).

In one embodiment, the social networking server 112 is a network-based appliance that responds to initialization requests or search queries from the client device 104. One or more users 136 may be a person, a machine, or other means of interacting with the client device 104. In various embodiments, the user 136 interacts with the network architecture 102 via the client device 104 or another means.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a user profile, to authenticate a user 136, to identify or locate other connected users 136, etc.). Conversely, if the social networking client 110 is not included in the client device 104, the client device 104 may use the web browser 106 to access the social networking server 112.

In addition to the client device 104, the social networking server 112 communicates with the one or more database servers 126 and databases 116-124. In one example embodiment, the social networking server 112 is communicatively coupled to a user activity database 116, a social graph database 118, a user profile database 120, a job postings database 122, and a notifications database 124.

The user profile database 120 stores user profile information about users 136 who have registered with the social networking server 112. With regard to the user profile database 120, the user 136 may be an individual person or an organization, such as a company, a corporation, a non-profit organization, an educational institution, or other such organizations.

In some example embodiments, when a user 136 initially registers to become a user 136 of the social networking service provided by the social networking server 112, the user 136 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 120. Similarly, when a representative of an organization initially registers the organization with the social networking service provided by the social networking server 112, the representative may be prompted to provide certain information about the organization, such as a company industry.

As users 136 interact with the social networking service provided by the social networking server 112, the social networking server 112 is configured to monitor these interactions. Examples of interactions include, but are not limited to, commenting on posts entered by other users 136, viewing user profiles, editing or viewing a user 136's own profile, sharing content outside of the social networking service (e.g., an article provided by an entity other than the social networking server 112), updating a current status, posting content for other users 136 to view and comment on, posting job suggestions for the users 136, searching job postings, and other such interactions. In one embodiment, records of these interactions are stored in the user activity database 116, which associates interactions made by a user 136 with his or her user profile stored in the user profile database 120.

The job postings database 122 includes job postings offered by companies. Each job posting includes job-related information such as any combination of employer, job title, job description, requirements for the job posting, salary and benefits, geographic location, one or more job skills desired, day the job posting was posted, relocation benefits, and the like.

The notifications database 124 stores notifications sent or queued to be sent to users, as well as other notification-related information, such as notification schedules and notification policies.

While the database server(s) 126 are illustrated as a single block, one of ordinary skill in the art will recognize that the database server(s) 126 may include one or more such servers. Accordingly, and in one embodiment, the database server(s) 126 implemented by the social networking service are further configured to communicate with the social networking server 112.

The social networking server 112 includes, among other modules, a notifications scheduler 128 and a notifications manager 130, which utilizes a machine-learning model for scheduling notifications that are sent to users. More details regarding the functionality of these modules are provided below. Each of the modules may be implemented in software, hardware, or any combination of software and hardware.

The network architecture 102 may also include a search engine 134. Although only one search engine 134 is depicted, the network architecture 102 may include multiple search engines 134. Thus, the social networking server 112 may retrieve search results (and, potentially, other data) from multiple search engines 134. The search engine 134 may be a third-party search engine. Examples of the search engine 134 include Bing, Ask, and search engines provided by Google, Yahoo!, Baidu, and AOL.

Figure 2:
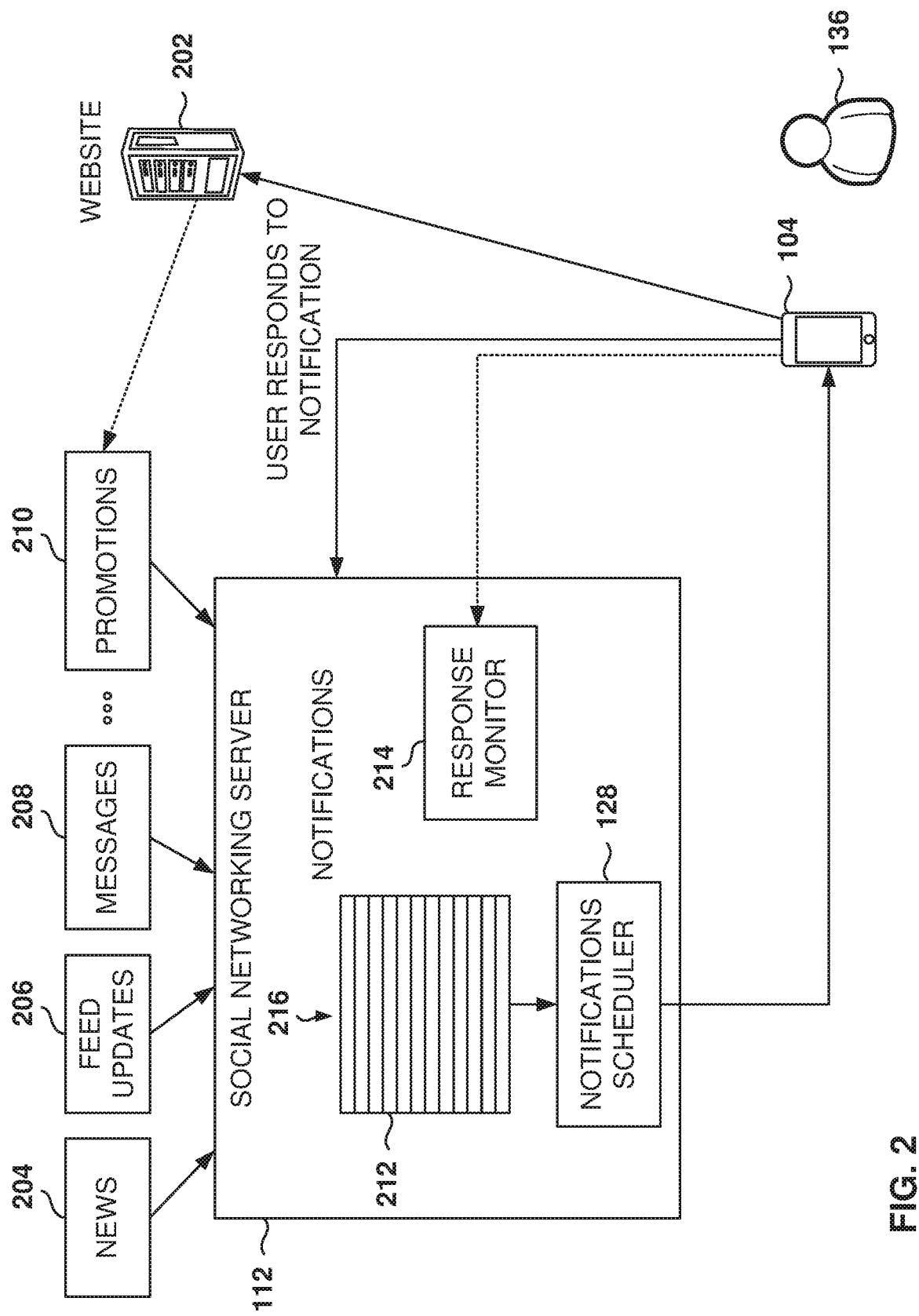
FIG. 2 illustrates the process for sending notifications to a user, according to some example embodiments.

FIG. 2 illustrates the process for sending notifications to a user, according to some example embodiments. As used herein, a notification 212 is a message sent to a user to inform the user of a certain fact, such as a feed update from a friend, a marketing promotion, a message from a connection, a news article, etc.

Thus, different types of notifications 212 may be generated by different systems, such as news 204, feed updates 206, messages 208, promotions 210, etc. The notifications are sent to the social networking server 112 and the social networking server 112 queues the notifications for processing in the notifications queue 216. In some example embodiments, the social networking server 112 may also generate the notifications.

The notifications scheduler 128 schedules the notifications 212 for delivery to the client device 104. For example, an app running on the client device 104 receives a notification 212 and creates a message for the user 136. In some cases, the user 136 responds to the notification 212, such as by visiting a website 202 with the link provided in the notification 212. A response monitor 214 keeps track of the user responses to the notifications 212.

It is typical to evaluate the responses of the user by looking at the short-term response of the user 136, such as by looking at the click-through rate, to determine the effectiveness of the notifications 212. Heuristics may be used to maximize the probability that the user 136 responds to a given notification. However, simply looking at the click-through rate or short-term responses hides other problems, such as the user 136 getting bombarded with notifications, not only from the social networking server 112 but from other sources also, that may cause the user 136 to start ignoring notifications 212 or canceling notifications 212 altogether. That is, the short-term benefit may lead to a long-term disadvantage.

Embodiments presented herein obtain a balance between short-term and long-term engagement in order to maximize the benefit for the social networking service and for the user 136. The decisions whether to send or not a notification are sequential. The goal is to make better sequential decisions, not just about what notification to send next, but also to find an optimal solution that provides a benefit over the short-term and the long-term (e.g., a week, a month, six months).

Several goals are considered when selecting the best scheduling policy, including, for example, maximizing the total number of user sessions over a period of time (e.g., a week), the total number of user contributions (e.g., actions on the social networking service such as posts, replies, likes, endorsement), maximizing the number of responses to the notifications, maximizing the number of jobs applied for, etc. A session refers to a use of the social networking service by the user, such as reading the feed, making a comment, adding a post, responding to a notification, etc.

Some notifications, such as work anniversaries and search appearances, are not usually time sensitive, while other notifications may be time sensitive, such as a message from a friend. The scheduler aims at sending notifications at the most opportune times to increase user engagement and satisfaction.

In some example embodiments, notifications to a given user are evaluated periodically (e.g., every four hours of the other time periods are also possible) to determine the notifications 212 in the notifications queue 216 and determine the order in which the notifications are sent and at what times.

Figure 3:
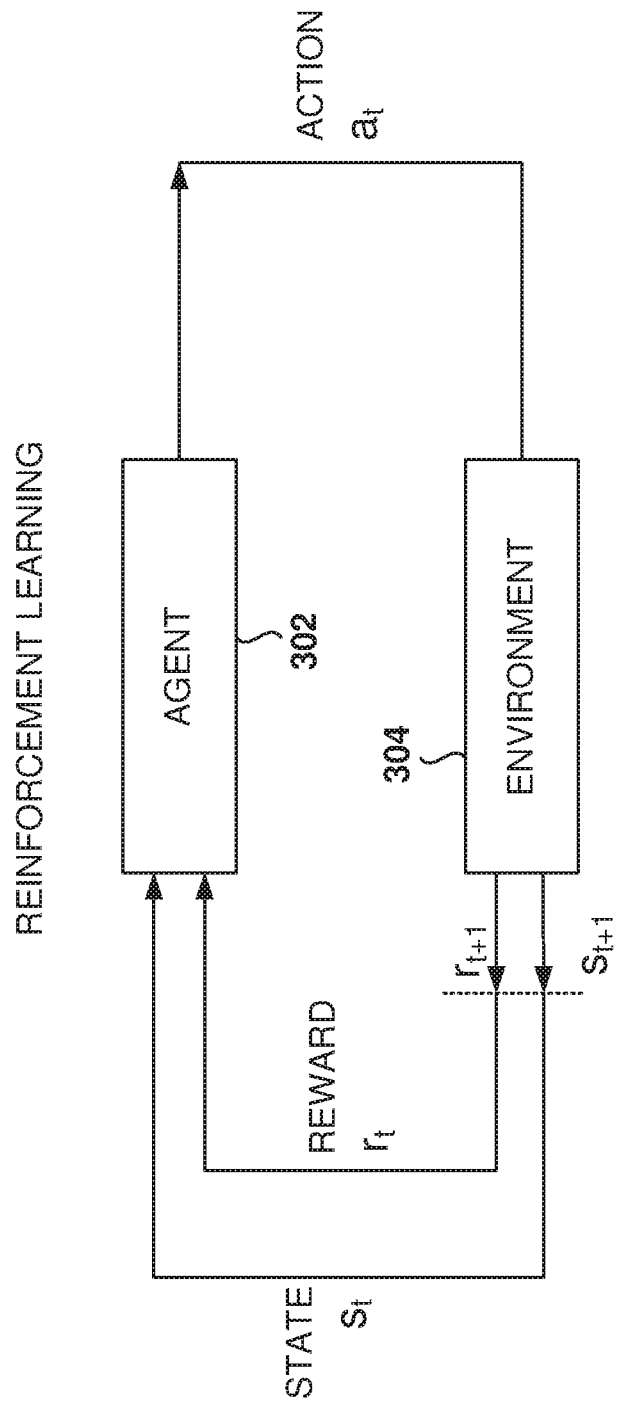
FIG. 3 illustrates the process of making assessments with reinforcement learning, according to some example embodiments

FIG. 3 illustrates the process of making assessments with reinforcement learning, according to some example embodiments. Reinforcement learning (RL) is an area of machine learning concerned with how software agents ought to take actions in an environment to maximize a cumulative value of a parameter, which is referred to as cumulative parameter value or cumulative reward. The cumulative value of the parameter is the addition of the values of the parameter (e.g., the reward) over time, such as the value of the parameter at different states. RL is one of three basic machine learning paradigms, alongside supervised learning and unsupervised learning. RL differs from supervised learning in that labelled input-output pairs need not be presented, and sub-optimal actions need not be explicitly corrected. Instead the focus is finding a balance between exploration (of uncharted territory) and exploitation (of current knowledge).

The environment (e.g., environment 304) is typically formulated as a Markov decision process (MDP), as many reinforcement learning algorithms for this context utilize dynamic programming techniques. RL includes sequential states, where each state has an action (e.g., decision), and the sequential decision making is for maximizing a total reward over a given horizon, while the system evolution is impacted by the actions taken at each state.

Reinforcement learning systems learn what to do given the situation so as to maximize some numerical value which represents a long-term objective. In a typical setting, an agent 302 receives the state $s_t$ of the environment 304 and a reward $r_t$ associated with the last action $a_{t-1}$ and state transition. RL then chooses an action $a_t$ based on RL's policy. In response, the system makes a transition to a new state $s_{t+1}$ and the cycle is repeated. The problem is to learn an RL policy for the agent 302 (e.g., the social networking service) to maximize the total reward for all states. Differently from supervised learning, with RL, only partial feedback is given to the learner about the learner's predictions.

In a standard reinforcement learning setting, an agent interacts with the environment over a number of discrete time steps. At every time step t, the agent receives a state $s_t$ and chooses an action $a_t$ according to a policy $\pi$, which is a deterministic or stochastic mapping from states $s_t$ to actions $a_t$. In return, the agent receives the next state $s_{t+1}$ and a scalar reward $r_t$. This long-term reward is defined as $$R_t = \sum_{k=0}^{\infty} \gamma^k r_{t+k}, \text{ where } \gamma \in (0, 1]$$

is the discount factor. This discount factor controls the tradeoff between the short-term optimization and long-term optimization. The goal of the agent is to maximize the expected $R_t$.

There is flexibility on when to send notifications. For example, a contact anniversary may be delivered now or within a few hours or even days. Based on the different states, sequential decisions are made with the goal to collect more rewards.

In some example embodiments, the environment 304 includes information about the user (e.g., profile information, activity history, contact information) and other factors, such as information of other users within their social networking service. The state s includes several parameters, such as the notification queue size, a badge count, a user engagement level, etc. The badge count is the number of notifications sent to the user. In some example embodiments, the information about the current state s includes encoded information about the past history of the system (e.g., notifications sent within 24 hours).

A state s is a function of the history. An informative state contains all useful information from the history to ensure Markov decision process:

$$P(s_{t+1}|s_t,a_t)=P(s_{t+1}|s_1, \ldots ,s_t,a_1, \ldots ,a_t).$$

Since Markov decision process is the foundation for reinforcement learning algorithms, states have to be defined properly to ensure that the state captures all relevant information from the history. More information regarding the state is provided below with reference to FIG. 5.

The action a is the decision to send or not send a notification. Further, the reward r denotes an immediate reward. Since the decision to send is evaluated periodically (e.g., every four hours), the reward is based on how much value a user gets during the period between decisions. In some example embodiments, the reward is the number of user sessions between decisions. In order example embodiments, the reward may also include other factors, such as the number of pages viewed, the number of contributions by the user, etc. Further, the RL policy refers to taking an action based on the state s.

The policy $\pi$ is a mapping from the state space to the action space, either deterministic or stochastic. For every Markov decision process, there exists an optimal deterministic policy, π*, which maximizes the long-term reward from any initial state.

The value of state s under policy π is defined as follows:

$$V^\pi(s) = E(R_t | s_t = s),$$

Here, E is the expected return for following policy π from state s. An optimal policy is $$V^*(s) = \max_\pi V^\pi(s), s \in S.$$

The action-value function under policy π is defined as $Q^\pi(s,a) = E[r_t | s_t = s, a]$, which maps a state and an action to an expected value of the total reward over all successive steps, starting from the current state.

Further, the optimal state-value function $$Q^*(s, a) = \max_\pi Q^\pi(s, a)$$

gives the maximum action value for states and action a achievable by any policy. The optimal value and action-value functions are connected as follows:

$$V^*(s) = \max_{a \in A} Q^*(s, a).$$

In the notification setting, the observable reward is whether there is a user visit and value from that visit in the following four hours after the notification is delivered. Such reward can be scarce for less active users. This may introduce high variance in the value function updates and may result in slow convergence and poor policy performance.

Figure 4:
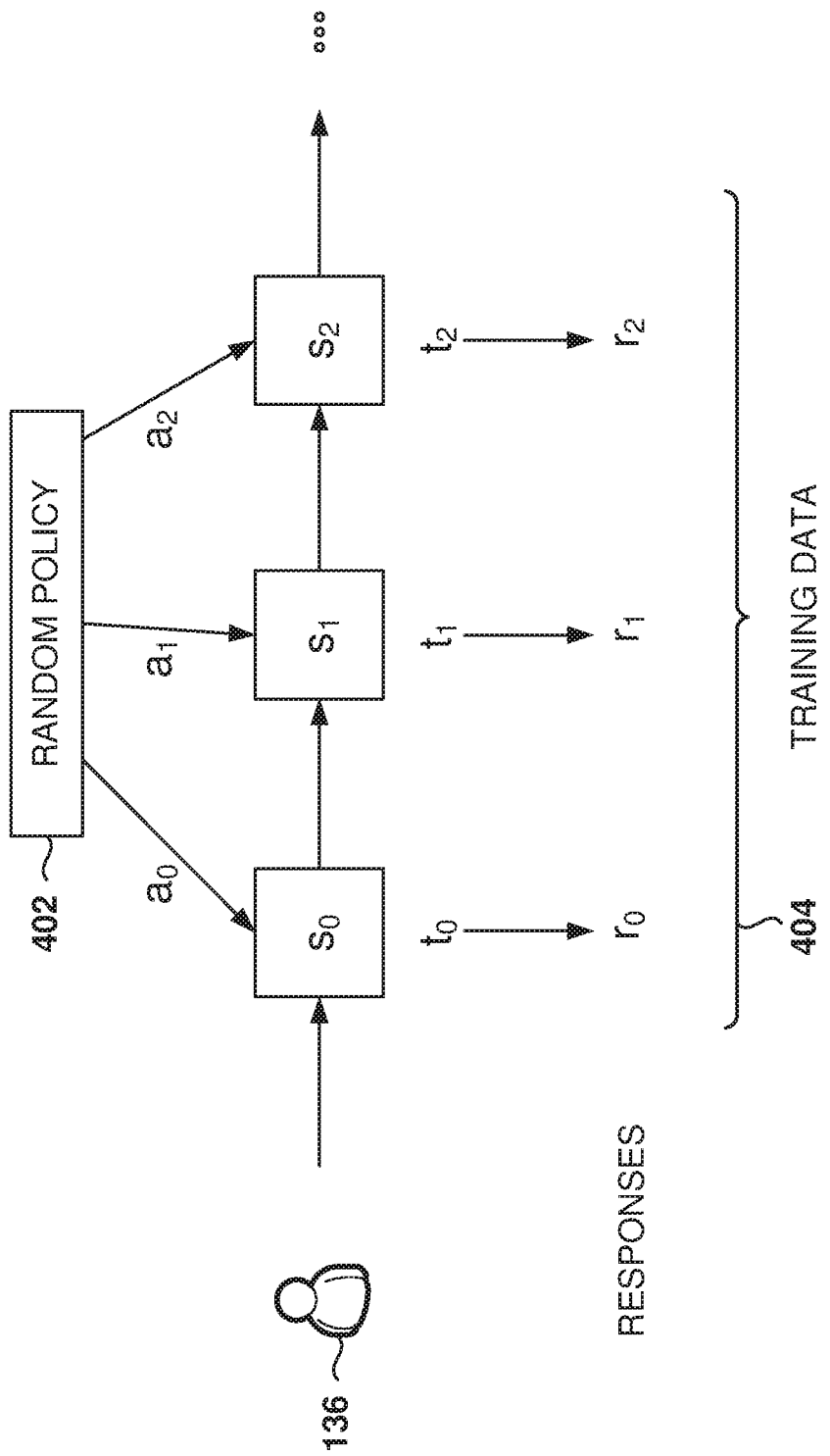
FIG. 4 illustrates the process of testing user responses to collective training data, according to some example embodiments.

FIG. 4 illustrates the process of testing user responses to collective training data, according to some example embodiments. In some example embodiments, a random policy 402 is used to send notifications (associated with actions $a_0$, $a_1$, $a_2$, etc.) at corresponding times t to users of the social networking service at different sequential states $s_0$, $s_1$, $s_2$, etc. In some example embodiments, the random policy 402 includes sending notifications with a predetermined probability (e.g., 30% probability to send a notification and 70% probability of not sending the notification).

The responses r of the users (e.g., whether the user has a session in the given state) are measured. All this information about states, actions, and responses is collected and used as training data 404 for the machine learning model.

Existing snapshots from the message spacing system can be transformed to provide data in the following format, defined by the user identifier (ID), time, state, and features:

mId: userId, t: time, $s_t$: features (state)

In some example embodiments, an offline replay system uses trajectories generated by a behavior policy and computes the expected return of a different policy, called the evaluation policy. The behavior policy here can be a random exploration policy to maximize the coverage on states and actions. To evaluate the performance of a policy, the total value of the states is evaluated.

FIG. 5 is a table 502 showing features for representing a state, according to some example embodiments. The state representation includes userLifeCycle, currentNotification-BadgeCount, localTime, LastClientApplication, notificationQueueSize, maxFPRScoreInQueue, hoursSinceLastBadgeUpdate, and isCapped.

The feature userLifeCycle reflects the activity level based on the number of sessions per day, week, or month. The currentNotificationBadgeCount indicates the number of notifications sent to the user in a predetermined period (e.g., the current four-hour period for the current state). The localTime is the hour at the location of the user at decision time, e.g., 2 AM.

is an internal metric that measures responsiveness of the user to notifications.

The LastClientApplication indicates the app used by the user in the last session with the social networking service (e.g., Android, IOS, desktop). The notificationQueueSize is the number of notifications waiting in the notifications queue to be sent to the user. The maxFPRScoreInQueue is the maximum first-pass ranker (FPR) score for the notifications in the notifications queue, where FPR is a score provided by a ranker that measures the value (e.g., quality) of the notification to the user.

The hoursSinceLastBadgeUpdate is the number of hours since the last notification was sent to the user. The isCapped indicates if hoursSinceLastBadgeUpdate has been capped to the maximum allowed value because sometimes there is no information on hoursSinceLastBadgeUpdate or hoursSinceLastBadgeUpdate is capped to a maximum amount (e.g., a week, which is 168 hours).

Figure 6:
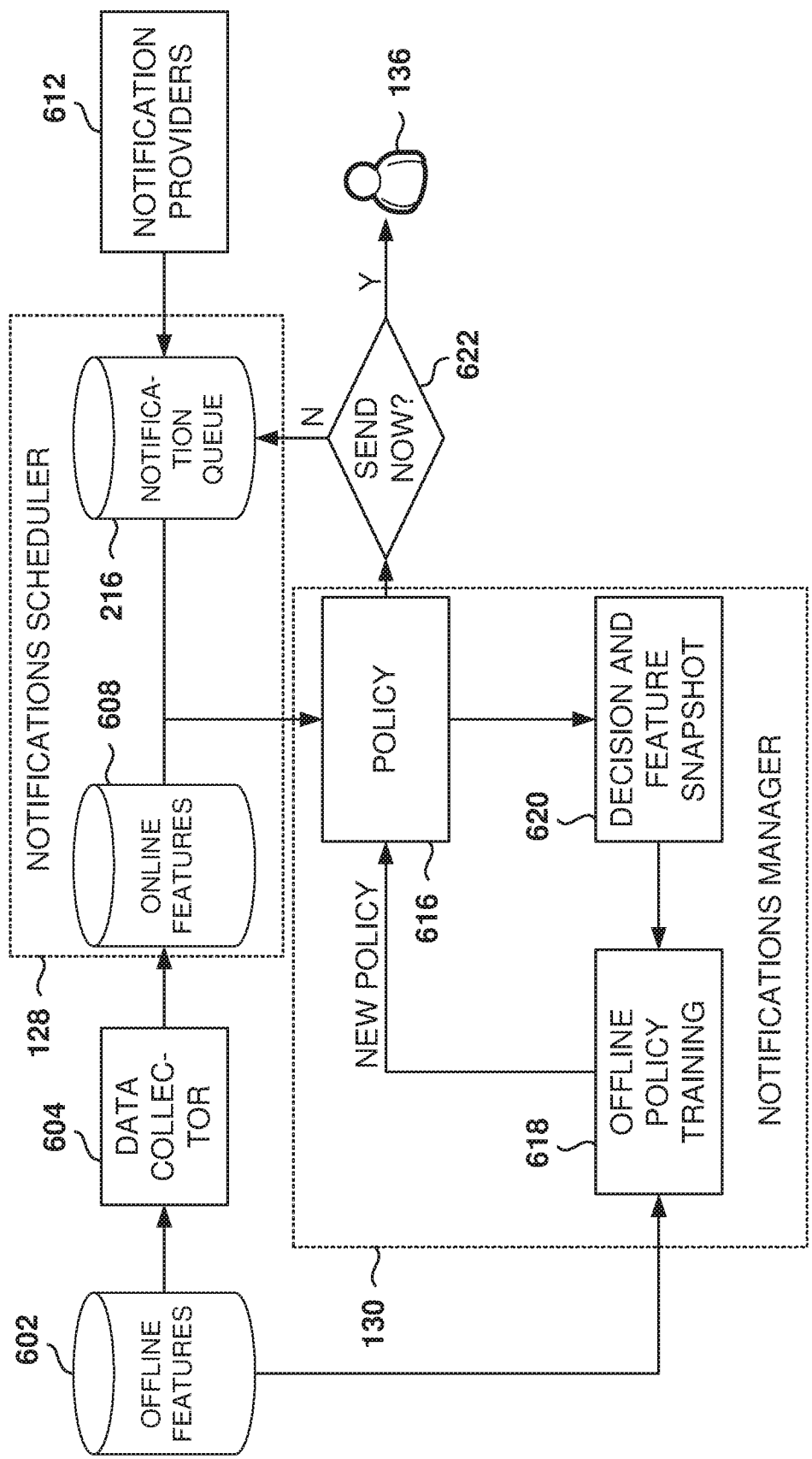
FIG. 6 is a sample system architecture for implementing embodiments.

FIG. 6 is a sample system architecture for implementing embodiments. A database 602 includes data for features maintained by other subsystems, such as user profile information. The data collector 604 provides the offline features to the notifications scheduler 128.

The notifications scheduler 128 includes an online-features database 608 that keeps information about notifications. Additionally, the notifications scheduler 128 includes a database with the notification queues 216 for all the users. The notifications are send by different notification providers 612.

Further, the notifications manager 130 has a notification policy and new policies may be tested by analyzing decision and feature snapshots 620 on responses from users to form the training data, which is then used by the off-line policy training 618 to assess the value of tested policies. If successful, a new policy may be made the current policy 616 used by the notifications system. The policy 616 determines when to send notifications (operation 622) to the user 136.

Figure 7:
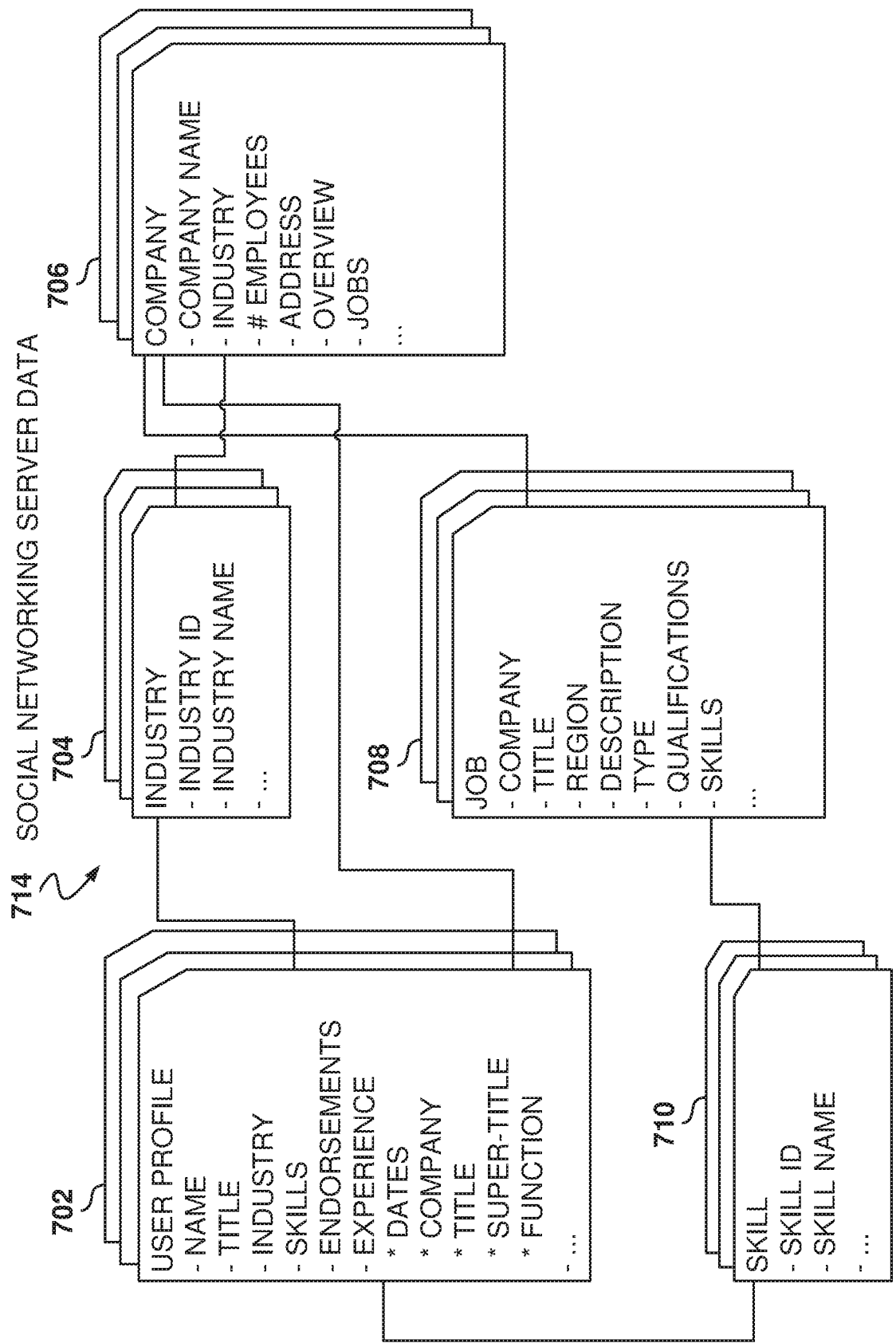
FIG. 7 illustrates data structures for storing social service data, according to some example embodiments.

FIG. 7 illustrates data structures for storing social service data 714, according to some example embodiments. Each user in the social networking service has a user profile 702, which includes information about the user. The user profile 702 is configurable by the user and includes information about the user and about user activity in the social networking service (e.g., items liked, posts read, jobs applied).

In one example embodiment, the user profile 702 may include information in several categories, such as experience, education, skills and endorsements, accomplishments, contact information, following, and the like. Skills include professional competences that the user has, and the skills may be added by the user or by other users of the social networking service. Example skills include C++, Java, Object Programming, Data Mining, Machine Learning, Data Scientist, and the like. Other users of the social networking service may endorse one or more of the skills and, in some example embodiments, the account is associated with the number of endorsements received for each skill from other users.

The user profile 702 includes user information, such as name, title (e.g., job title), industry (e.g., legal services), geographic region, jobs, skills and endorsements, and so forth. In some example embodiments, the user profile 702 also includes job-related data, such as employment history, jobs previously applied to, or jobs already suggested to the user (and how many times the job has been suggested to the user). The experience information includes information related to the professional experience of the user, and may include, for each job, dates, company, title, super-title, functional area, industry, etc. Within user profile 702, the skill information is linked to skill data 710, the employer information is linked to company data 706, and the industry information is linked to industry data 704. Other links between tables may be possible.

The skill data 710 and endorsements includes information about professional skills that the user has identified as having been acquired by the user, and endorsements entered by other users of the social networking service supporting the skills of the user. Accomplishments include accomplishments entered by the user, and contact information includes contact information for the user, such as email and phone number.

The industry data 704 is a table for storing the industries identified in the social networking service. In one example embodiment, the industry data 704 includes an industry identifier (e.g., a numerical value or a text string), and an industry name, which is a text string associated with the industry (e.g., legal services).

In one example embodiment, the company data 706 includes company information, such as company name, industry associated with the company, number of employees, address, overview description of the company, job postings, and the like. In some example embodiments, the industry is linked to the industry data 704.

The skill data 710 is a table for storing the different skills identified in the social networking service. In one example embodiment, the skill data 710 includes a skill identifier (ID) (e.g., a numerical value or a text string) and a name for the skill. The skill identifier may be linked to the user profile 702 and job data 708.

In one example embodiment, job data 708 includes data for jobs posted by companies in the social networking service. The job data 708 includes one or more of a title associated with the job (e.g., software developer), a company that posted the job, a geographic region for the job, a description of the job, job type (e.g., full time, part time), qualifications required for the job, and one or more skills. The job data 708 may be linked to the company data 706 and the skill data 710.

It is noted that the embodiments illustrated in FIG. 7 are examples and do not describe every possible embodiment. Other embodiments may utilize different data structures, fewer data structures, combine the information from two data structures into one, add additional or fewer links among the data structures, and the like. The embodiments illustrated in FIG. 7 should therefore not be interpreted to be exclusive or limiting, but rather illustrative.

Figure 8:
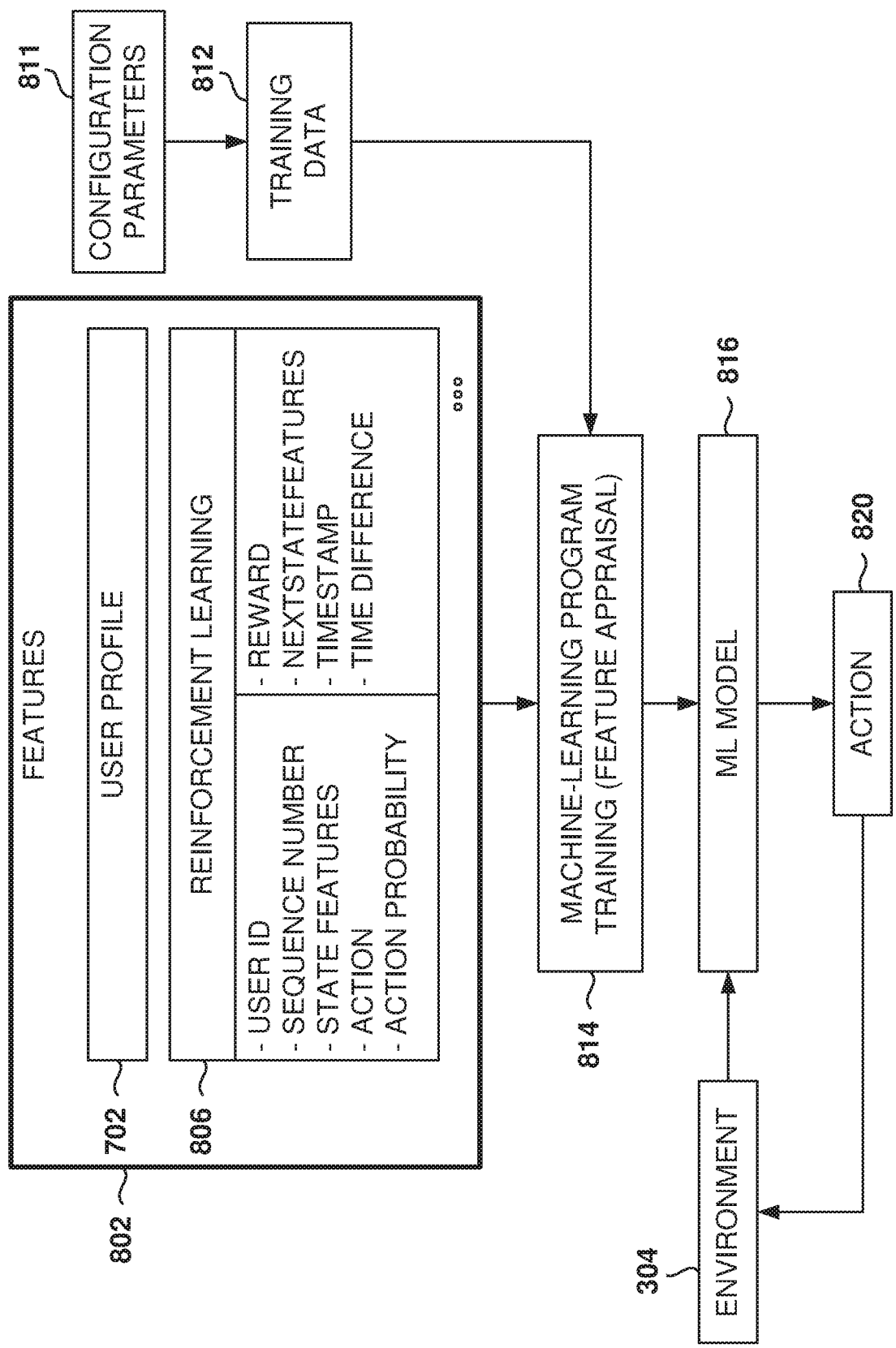
FIG. 8 illustrates the training and use of a machine-learning program, according to some example embodiments.

FIG. 8 illustrates the training and use of a machine-learning program, according to some example embodiments. In some example embodiments, machine-learning programs (MLPs), also referred to as machine-learning algorithms or tools, are utilized to perform operations associated with notifications, such as determining whether to send a notification or not.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 816 from example training data 812 in order to make data-driven predictions or decisions expressed as actions 820. Although example embodiments are presented with respect to a few machine-learning tools, the principles presented herein may be applied to other machine-learning tools.

There are three common modes for ML: supervised ML, unsupervised ML, and reinforcement learning. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data. RL is an area of machine learning concerned with how software agents ought to take actions in an environment to maximize a cumulative reward.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

In some example embodiments, example machine-learning models 816 provide a yes/no decision on whether to send a notification to a user. In other example embodiments, the output of the ML model 816 is a score regarding a recommendation to send a notification; the notification is sent when the score is above a threshold.

The machine-learning algorithms utilize the training data 812 to find correlations among identified features 802 that affect the outcome. A feature 802 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, the features 802 may be of different types and may include one or more feature 802 of user profile 702 and reinforcement learning feature 806. In some example embodiments, the reinforcement learning features 806 include one or more of user identifier (D), sequence number (the state sequence number that increases at each new state), state features (features describing the current state $S_t$), action (associated with the last completed state), action probability (probability that a notification will be sent), reward (associated with the last completed state, reward (e.g., one if the user is in a session in the state or zero if the user is not in a session in the state), next-state features (offline features for the next state), timestamp for the last state transition, and time difference from the last state transition.

During training 814, the ML algorithm analyzes the training data 812 based on identified features 802 and configuration parameters 811 defined for the training 814. The result of the training 814 is an ML model 816 that is capable of taking inputs to produce actions 820.

Training an ML algorithm involves analyzing large amounts of data (e.g., from several gigabytes to a terabyte or more) in order to find data correlations. The ML algorithms utilize the training data 812 to find correlations among the identified features 802 that affect the outcome or assessment (e.g., action 820). In some example embodiments, the training data 812 includes labeled data, which is known data for one or more identified features 802 and one or more outcomes, such as state information, notifications sent, and responses of users to the notifications.

The ML algorithms usually explore many possible functions and parameters before finding what the ML algorithms identify to be the best correlations within the data; therefore, training may require large amounts of computing resources and time.

Many ML algorithms include configuration parameters 811, and the more complex the ML algorithm, the more parameters there are that are available to the user. The configuration parameters 811 define variables for an ML algorithm in the search for the best ML model 816. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that requires a large amount of computer resources.

When the ML model 816 is used to perform an assessment, new data from the environment 304 is provided as an input to the ML model 816, and the ML model 816 generates the action 820 as output. For example, when a notification is evaluated to be sent, the action 820 will determine if the notification is sent.

Figure 9:
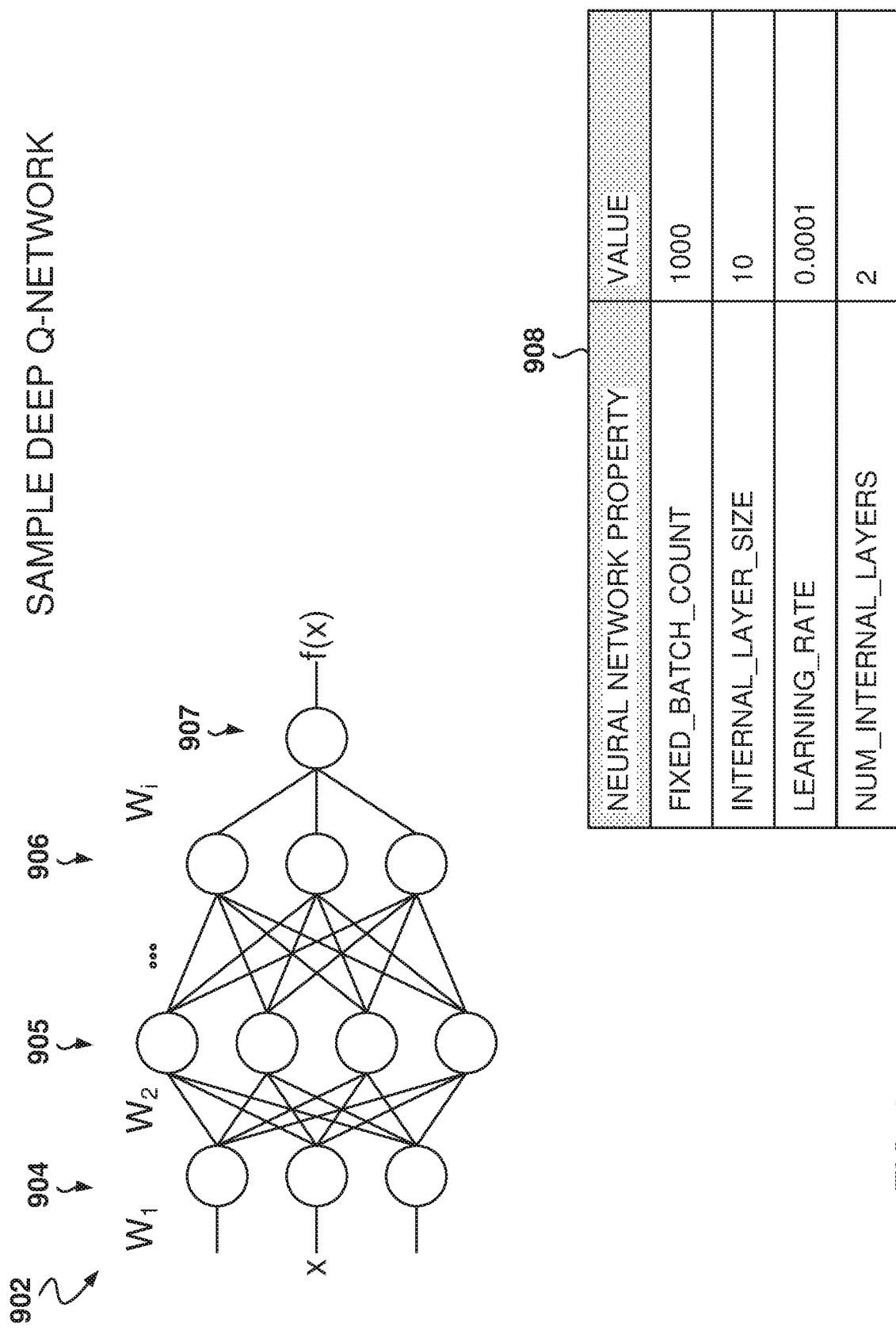
FIG. 9 shows a sample embodiment using a neural network.

FIG. 9 shows a sample embodiment using a neural network. A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) 902 is a stacked neural network, which is composed of multiple layers 904-907. The layers are composed of nodes, which are locations where computation occurs, loosely patterned on a neuron in the human brain, which fires when it encounters sufficient stimuli. A node combines input from the data with a set of coefficients, or weights W, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. The DNN 902 uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training data, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Q-learning is a model-free reinforcement learning algorithm. The goal of Q-learning is to learn a policy, which tells an agent what action to take under what circumstances. It does not require a model of the environment, and it can handle problems with stochastic transitions and rewards, without requiring adaptations.

Traditional Q-learning works on a finite discrete state space and updates the Q(s,a) table until convergence. When the state space is large or continuous in some dimensions, the tabular Q-learning becomes infeasible. The deep Q-networks (DQN) go beyond linear approximation and use a convolutional neural network to map state and action onto a value. DQN is a model-free, off-policy method and DQN leverages an experience replay mechanism to smooth the training distribution over many past behaviors.

For any finite Markov decision process (FMDP), Q-learning finds a policy that is optimal in the sense that it maximizes the expected value of the total reward over any and all successive steps, starting from the current state. Q-learning can identify an optimal action-selection policy for any given FMDP, given infinite exploration time and a partly-random policy. "Q" names the function that returns the reward used to provide the reinforcement and can be said to stand for the "quality" of an action taken in a given state.

In some example embodiments, the DNN 902, used for notification decisions, includes four layers: an input layer 904, two hidden layers 905-906, and an output layer 907. The DDN hyperparameters, described in table 908, include fixed_batch_count (e.g., 1000), internal_layer_size (e.g., 10), learning_rate (e.g., 0.0001), and num_internal_layers (e.g., 2-hidden layers 905 and 906).

In some example embodiments, the tuning of the hyperparameters includes adjusting the number of inner layers on the number of nodes in each layer, adjusting the batch size, adjusting regularization, trying different number of batches for a fixed target network, and adjusting the learning rate.

In some example embodiments, there are two possible actions at any given timestamp t. To make a good decision, the long term total reward of making each action is calculated, which is the Q function. The DNN 902 learns the Q function for a particular state s, which is defined as:

$$Q\pi(s,a)=E[R(\tau)|s_0=s,a]$$

Here, E is the expected discounted cumulative reward for a given state s and action a. The Bellman equation provides the following:

$$Q^\pi(s_t, a) = r_t + \gamma^{t_{s+1}-t_s} \max_{a'} Q^\pi(s_{t+1}, a')$$

Figure 10:
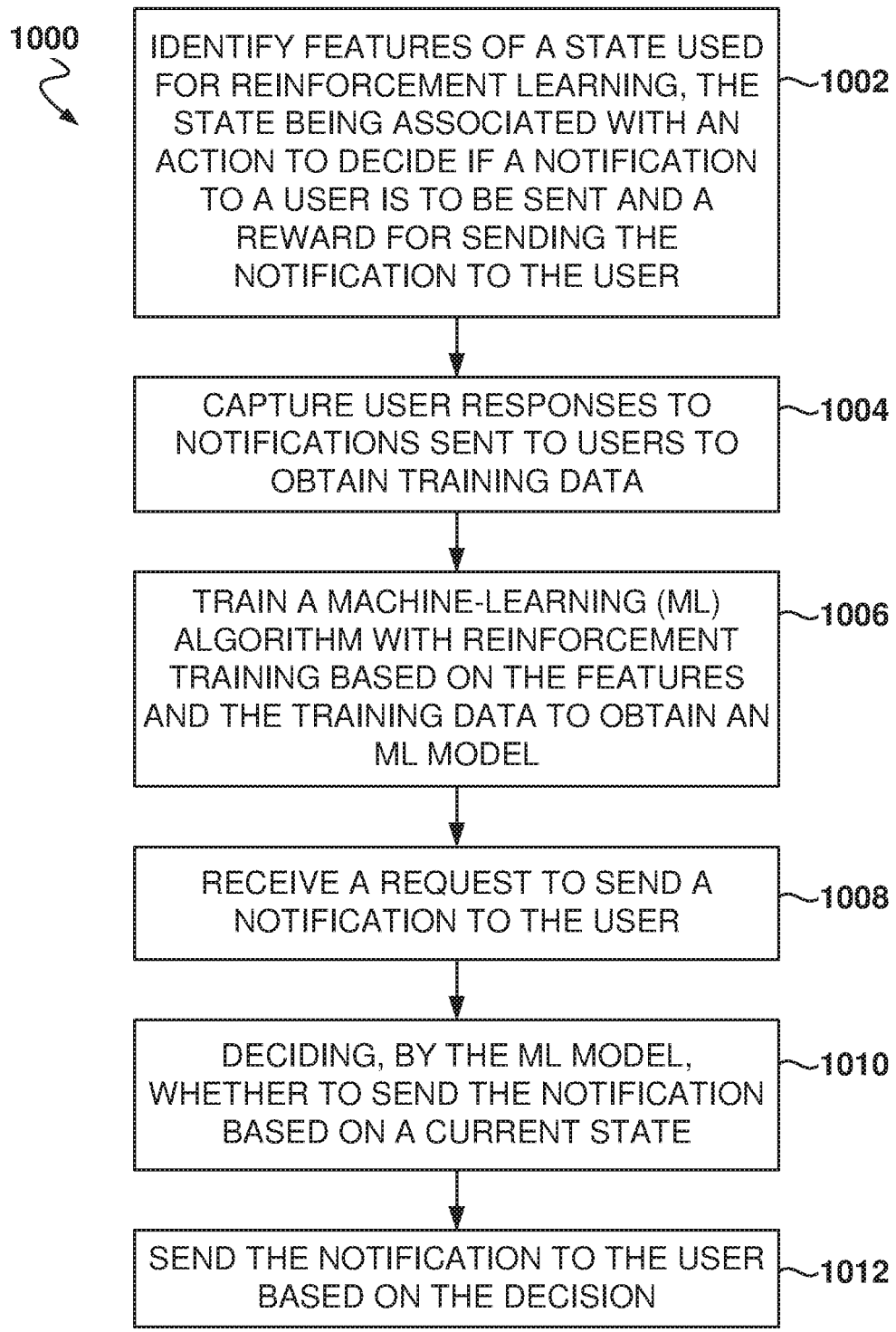
FIG. 10 is a flowchart of a method for scheduling user notifications to maximize short-term and long-term benefits from sending the notifications, according to some example embodiments.

FIG. 10 is a flowchart of a method 1000 for scheduling user notifications, according to some example embodiments. While the various operations in this flowchart are presented and described sequentially, one of ordinary skill will appreciate that some or all of the operations may be executed in a different order, be combined or omitted, or be executed in parallel.

Operation 1002 is for identifying features of a state used for reinforcement learning. The state is associated with an action to decide if a notification to a user is to be sent and a reward for sending the notification to the user. In some example embodiments, the value of the reward is a numerical value and one goal is to maximize the sum of the values of the rewards across a plurality of states.

From operation 1002, the method 1000 flows to operation 1004 for capturing user responses to notifications sent to users to obtain training data.

From operation 1004, the method 1000 flows to operation 1006 where a machine-learning (ML) algorithm with reinforcement learning is trained based on the features and the training data to obtain an ML model.

In operation 1008, a request is received to send a notification to the user. From operation 1008, the method 1000 flows to operation 1010 for deciding, by the ML model, whether to send the notification based on a current state.

In operation 1012, the notification is sent to the user based on the decision.

In one example, deciding whether to send further notifications comprises maximizing a total number of rewards for a plurality of states, the reward for each state identifying if the user engages in a session during a period associated with the state. For example, the reward may have a value of 1 if the user engages in the session and a value of 0 if the user does not engage. The total number of rewards is the sum of the rewards for the plurality of states. In other example embodiments, the reward may be a real number between 0 and 1 indicating a probability that the user engages in the session.

In one example, the features of the state comprise an activity level of the user, a number of notifications sent to the user, a type of client machine used by the user in a last session, a number of queued notifications for the user, and a maximum ranking score for the queued notifications.

In one example, the state changes every four hours.

In one example, the ML algorithm is further based on user features having user profile information.

In one example, the ML algorithm is a neural network having four layers with an internal layer size of ten nodes.

In one example, notifications include news articles, user feed updates, messages to the user from other users, and promotions.

In one example, capturing user responses further comprises identifying a plurality of user notifications, sending the plurality of user notifications with a predetermined probability, and capturing the user responses to the notifications that were sent.

In one example, the method 1000 further comprises re-training the ML algorithm with additional data corresponding to notifications sent to users.

Another general aspect is for a system that includes a memory comprising instructions and one or more computer processors. The instructions, when executed by the one or more computer processors, cause the one or more computer processors to perform operations comprising: identifying features of a state used for reinforcement learning, the state being associated with an action to decide if a notification to a user is to be sent and a reward for sending the notification to the user; capturing user responses to notifications sent to users to obtain training data: training a machine-learning (ML) algorithm with reinforcement training based on the features and the training data to obtain an ML model; receiving a request to send a notification to the user; deciding, by the ML model, whether to send the notification based on a current state; and sending the notification to the user based on the decision.

In yet another general aspect, a machine-readable storage medium (e.g., a non-transitory storage medium) includes instructions that, when executed by a machine, cause the machine to perform operations comprising: identifying features of a state used for reinforcement learning, the state being associated with an action to decide if a notification to a user is to be sent and a reward for sending the notification to the user; capturing user responses to notifications sent to users to obtain training data; training a machine-learning (ML) algorithm with reinforcement training based on the features and the training data to obtain an ML model: receiving a request to send a notification to the user: deciding, by the ML model, whether to send the notification based on a current state; and sending the notification to the user based on the decision.

Figure 11:
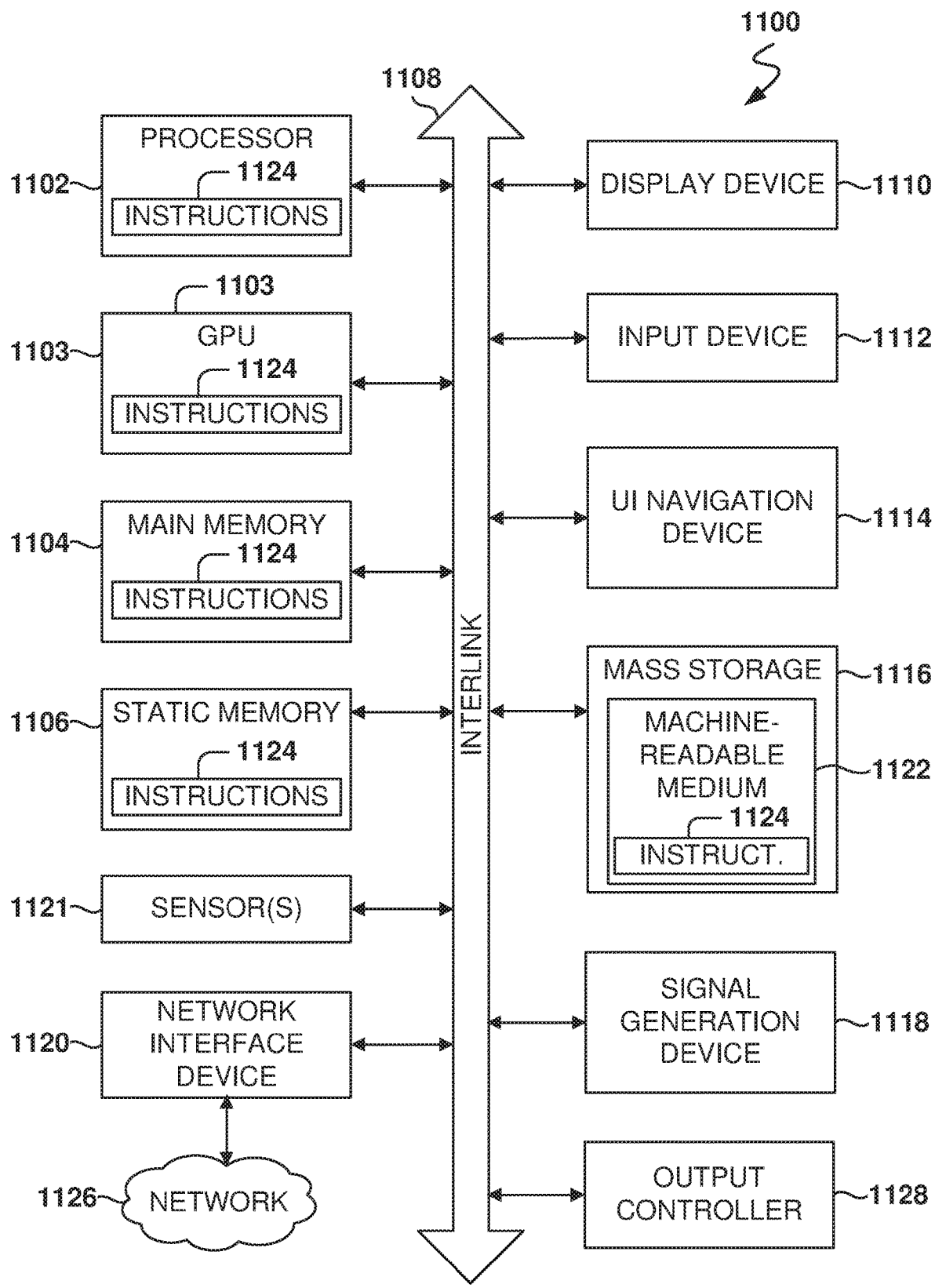
FIG. 11 is a block diagram illustrating an example of a machine upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry usership may be flexible overtime and underlying hardware variability. Circuitries include users that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create users of the circuitry in hardware via the variable connections to carry out portions of the specific operation when in operation. Accordingly, the computer-readable medium is communicatively coupled to the other components of the circuitry when the device is operating. In an example, any of the physical components may be used in more than one user of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor, the machine 1100 may include an output controller 1128, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   identifying features of a state used for reinforcement learning in an online service, the state comprising an activity level of a user and a number of notifications sent to the user, the state being associated with an action that is a decision made to decide if a notification to the user is sent and a reward for sending the notification to the user, the reward for each state based on the user visiting the online service within a predetermined period after sending the notification to the user;
   capturing user responses to notifications sent to users to obtain training data, wherein capturing the user responses further comprises:
      identifying a plurality of user notifications;
      for each user notification from the plurality of user notifications, determining whether to send the user notification based on a predetermined probability of sending the notification; and
      capturing the user responses to the notifications that were sent;
   training a machine-learning (ML) algorithm with reinforcement learning based on the features and the training data to obtain an ML model;
   receiving a request to send a notification to the user;
   deciding, by the ML model, whether to send the notification based on a current state; and
   sending the notification to the user based on the decision.

2. The method as recited in claim 1, wherein deciding whether to send further comprises:
   maximizing a total number of rewards for a plurality of states, the reward for each state based on the user visiting the online service within a predetermined period after sending the notification to the user.

3. The method as recited in claim 1, wherein the features of the state further comprise a type of client machine used by the user in a last session, a number of queued notifications for the user, and a maximum ranking score for the queued notifications.

4. The method as recited in claim 1, wherein the state changes every four hours.

5. The method as recited in claim 1, wherein the ML algorithm is further based on user features having user profile information.

6. The method as recited in claim 1, wherein the ML algorithm is a neural network having four layers with an internal layer size of ten nodes.

7. The method as recited in claim 1, wherein notifications include news articles, user feed updates, messages to the user from other users, and promotions.

8. The method as recited in claim 1, further comprising:
   re-training the ML algorithm with additional data corresponding to notifications sent to users.

9. A system comprising:
   a memory comprising instructions; and
   one or more computer processors, wherein the instructions, when executed by the one or more computer processors, cause the system to perform operations comprising:
      identifying features of a state used for reinforcement learning in an online service, the state comprising an activity level of a user and a number of notifications sent to the user, the state being associated with an action that is a decision made to decide if a notification to the user is sent and a reward for sending the notification to the user, the reward for each state based on the user visiting the online service within a predetermined period after sending the notification to the user;
      capturing user responses to notifications sent to users to obtain training data, wherein capturing the user responses further comprises:
         identifying a plurality of user notifications;
         for each user notification from the plurality of user notifications, determining whether to send the user notification based on a predetermined probability of sending the notification; and
         capturing the user responses to the notifications that were sent;
      training a machine-learning (ML) algorithm with reinforcement learning based on the features and the training data to obtain an ML model;
      receiving a request to send a notification to the user;
      deciding, by the ML model, whether to send the notification based on a current state; and
      sending the notification to the user based on the decision.

10. The system as recited in claim 9, wherein deciding whether to send further comprises:
    maximizing a total number of rewards for a plurality of states, the reward for each state based on the user visiting the online service within a predetermined period after sending the notification to the user.

11. The system as recited in claim 9, wherein the features of the state comprise a type of client machine used by the user in a last session, a number of queued notifications for the user, and a maximum ranking score for the queued notifications.

12. The system as recited in claim 11, wherein the state changes every four hours.

13. A non-transitory machine-readable storage medium including instructions that, when executed by a machine, cause the machine to perform operations comprising:
  identifying features of a state used for reinforcement learning in an online service, the state comprising an activity level of a user and a number of notifications sent to the user, the state being associated with an action that is a decision made to decide if a notification to the user is sent and a reward for sending the notification to the user, the reward for each state based on the user visiting the online service within a predetermined period after sending the notification to the user;
  capturing user responses to notifications sent to users to obtain training data, wherein capturing the user responses further comprises:
    identifying a plurality of user notifications;
    for each user notification from the plurality of user notifications, determining whether to send the user notification based on a predetermined probability of sending the notification; and
    capturing the user responses to the notifications that were sent;
  training a machine-learning (ML) algorithm with reinforcement learning based on the features and the training data to obtain an ML model;
  receiving a request to send a notification to the user;
  deciding, by the ML model, whether to send the notification based on a current state; and
  sending the notification to the user based on the decision.

14. The non-transitory machine-readable storage medium as recited in claim 13, wherein deciding whether to send further comprises:
  maximizing a total number of rewards for a plurality of states, the reward for each state based on the user visiting the online service within a predetermined period after sending the notification to the user.

15. The non-transitory machine-readable storage medium as recited in claim 13, wherein the features of the state comprise a type of client machine used by the user in a last session, a number of queued notifications for the user, and a maximum ranking score for the queued notifications.

16. The non-transitory machine-readable storage medium as recited in claim 13, wherein the state changes every four hours.

* * * * *

UNITED STATES PATENT AND TRADEMARK OFFICE
CERTIFICATE OF CORRECTION

PATENT NO. : 11,556,864 B2
APPLICATION NO. : 16/674422
DATED : January 17, 2023
INVENTOR(S) : Yuan et al.

It is certified that error appears in the above-identified patent and that said Letters Patent is hereby corrected as shown below:

In the Claims

In Column 18, Line 66, in Claim 12, delete "claim 11," and insert --claim 9,-- therefor Signed and Sealed this
Twenty-first Day of March, 2023

Katherine Kelly Vidal
*Director of the United States Patent and Trademark Office*